Patented Feb. 11, 1936

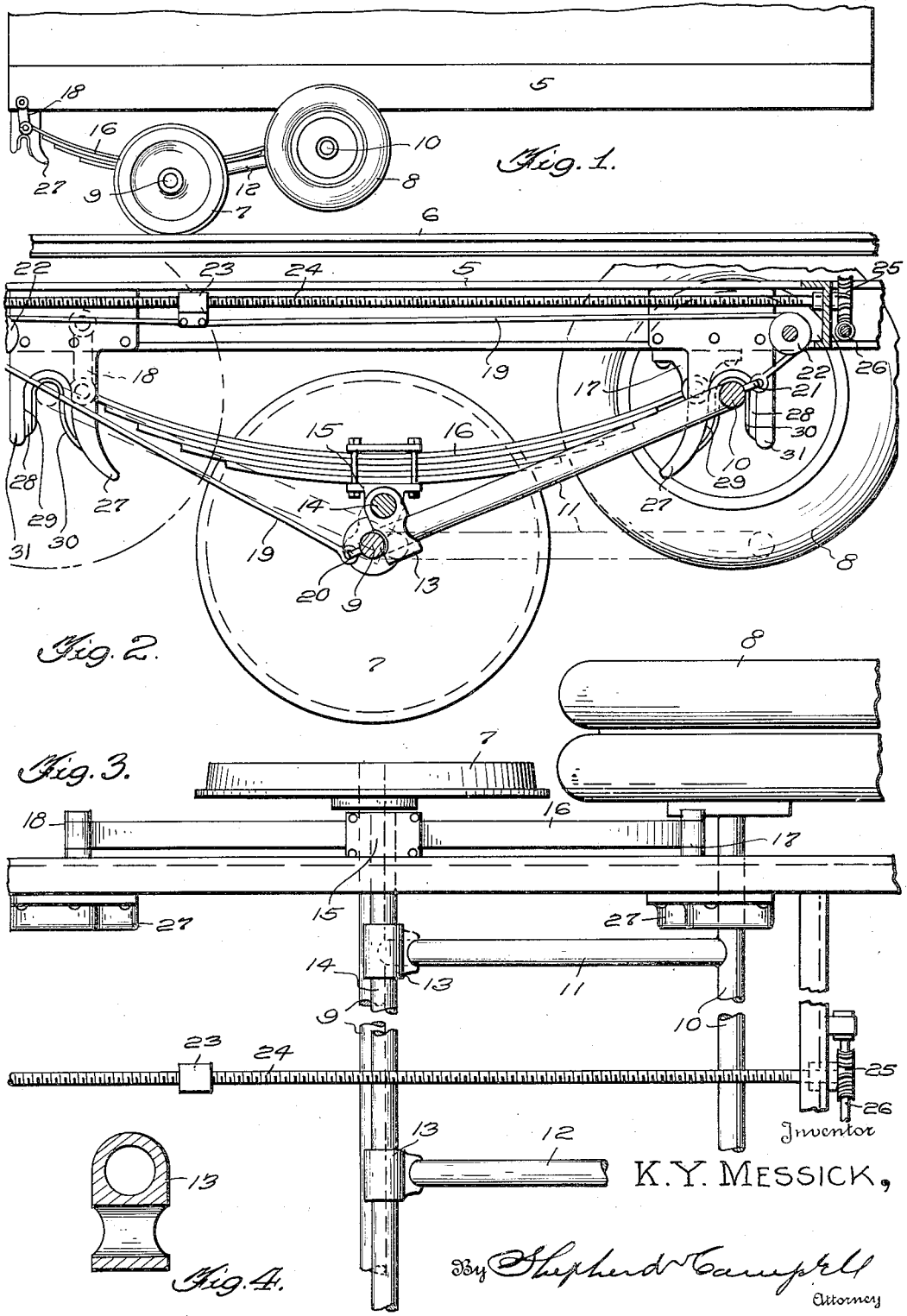

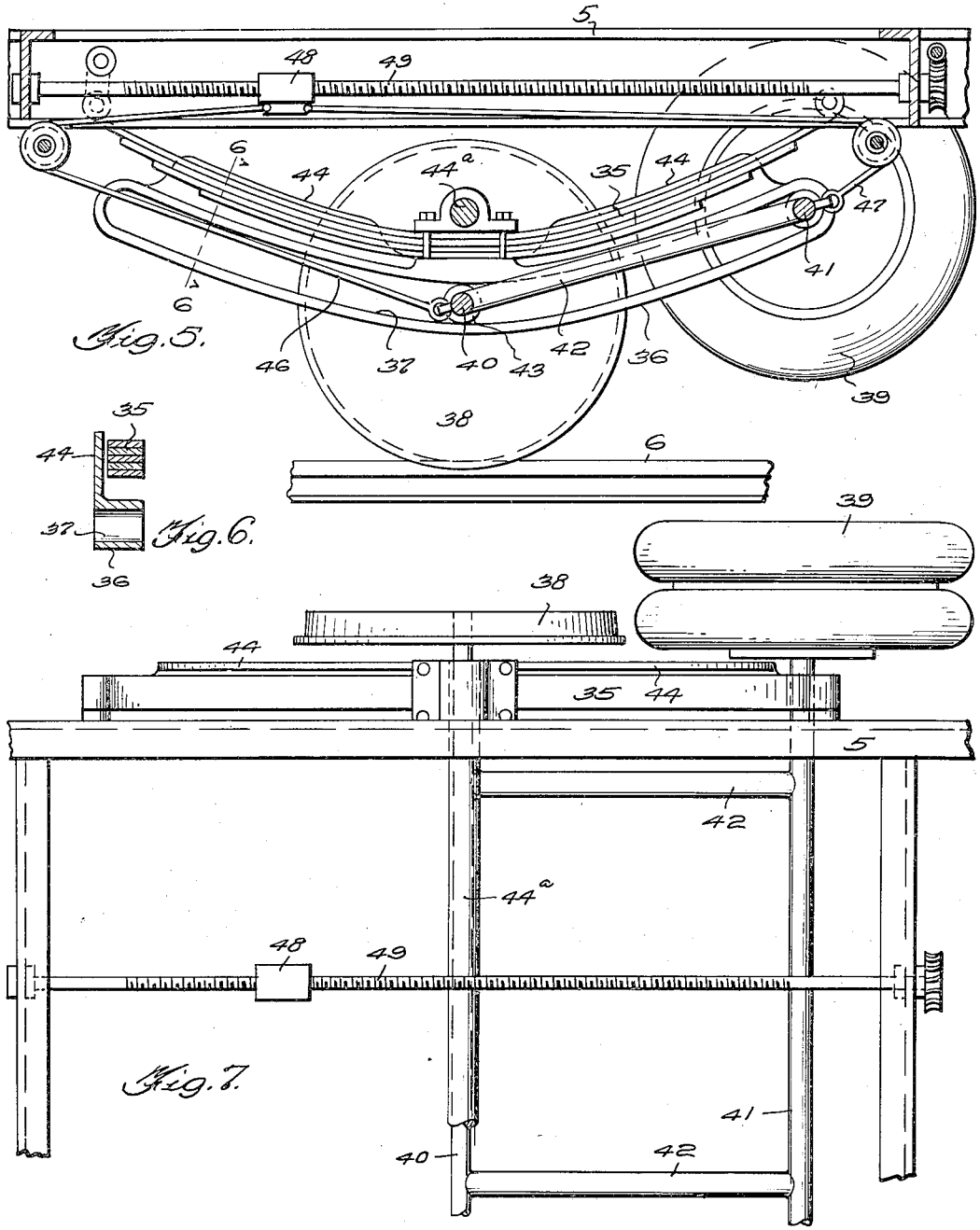

2,030,311

UNITED STATES PATENT OFFICE 2,030,311

COMBINED ROAD AND RAIL VEHICLE

Kirwan Y. Messick, Clarendon, Va.

Application February 20, 1934, Serial No. 712,183

9 Claims. (Cl. 105—215)

This invention relates to combined road and rail vehicles of the character of those shown in my copending application Serial No. 660,941, filed March 15, 1933.

As is set forth in the application aforesaid, the railroads of the country are confronted with the necessity of providing store door delivery of freight shipments. The growing practice of shippers of loading goods upon a truck at the point of origin and delivering it directly to a store, warehouse, or other point of destination with but a single handling is so much more convenient than the old practice of carting goods to a rail station; placing them upon a freight car, and again unloading them to a vehicle at a railroad terminal for final delivery, that it has become apparent that if the railroads are to survive they must provide direct delivery service of freight shipments.

In the provision of a vehicle of the character of that constituting the present invention, more is necessary than to merely provide means whereby the vehicle may be caused to run either upon a railroad track or upon a highway, and it is with the view of meeting these special requirements that the present invention has been particularly designed.

One of the primary objects of the invention is to provide a vehicle having a set of ground wheels and a set of track wheels together with means for shifting either of said sets of wheels into position for action; either set of wheels when in use bearing the same relation to the vehicle springs or equivalent point of support no matter which set of wheels is being used.

A further object of the invention is to provide a device of the character indicated having ground and track wheels, together with means for bodily shifting either of said sets of wheels to operative position and wherein the shifting means is under substantially no strain after the work of shifting the wheels has been completed.

It is a further object of the invention to provide in a structure of the character indicated a truck like body carrying ground wheels at one end and track wheels at the other together with means for shifting said truck like body longitudinally with respect to the vehicle body and to an inclination in such manner that either the ground or the track wheels will be moved downwardly to operating position and into a position common to either set of wheels with respect to the vehicle body when said wheels are in operative position. In conjunction with this shifting movement, points of thrust are provided with which the free ends of the trucks are engaged to cause the truck like body to serve as radius rods for the wheels in action.

A further object of the invention is to provide a structure of the character indicated in which the wheels may be shifted either manually or under the influence of a power element.

It is highly essential, in conjunction with vehicles intended to be connected in trains to be run upon a railroad with maximum of safety to provide against the possibility of the wheels that are intended to be out of action, dropping accidentally, and as this description proceeds it will be seen that the structure described is admirably adapted to achieve this result.

Further objects and advantages will be set forth in the following description.

In the accompanying drawings:

Figure 1 is a side elevation of a portion of a vehicle having the device of my invention applied thereto.

Figure 2 is an enlarged longitudinal sectional view of the vehicle illustrating the tiltable truck and the actuating means for the same.

Figure 3 is a fragmentary plan view of the structure of Figure 2.

Figure 4 is a detail sectional view of a hanger hereinafter described.

Figure 5 is a vertical sectional view illustrating a modified form of the invention.

Figure 6 is a detail sectional view on line 6—6 of Fig. 5.

Figure 7 is a plan view of the structure of Fig. 5 and

Figure 8 is a detail view illustrating a hydraulic cylinder as the actuating means for shifting the truck.

Like numerals designate corresponding parts in all the figures of the drawings.

Referring to the drawings, 5 designates the body of a road vehicle in the nature of a large truck or freight car. This vehicle is rendered capable of travelling upon either the railroad track, indicated at 6, or a highway, by the provision of track wheels 7 and ground wheels 8. These wheels are mounted upon axles 9 and 10, and said axles are held in properly spaced relation to each other by longitudinal rods 11 and 12. The rods 11 and 12 are slidable through hangers 13; said hangers, in turn, being hung upon a cross bar 14 supported from spring clamps 15.

The springs 16, only one of which is shown but which are duplicated at the opposite sides of the vehicle, are connected at their forward ends to fixed brackets 17 and at their rear ends to the pivoted links or hangers 18. A strong steel cable 19 is connected, at 20, to the axle 9 upon which the wheels 7 turn, and a like strong steel cable is connected, at 21, to the axle 10, upon which the ground wheels 8, turn. These cables pass over guide pulleys 22 and are connected to a travelling block 23. Forcible endwise movement may be imparted to this block by means of a screw 24 with respect to which the block acts as a nut.

Any desired means may be provided for turning the screw 24, such for example as the provision of a worm wheel 25 and a transversely disposed worm pinion 26, which may be actuated from a side of the vehicle, by means of a crank handle in a manner common in the actuating mechanisms of truck bodies.

When the screw 24 is turned and the nut is caused to travel longitudinally, the structure comprising the ground and track wheels, the axles and the longitudinal rods 11 and 12 will be shifted bodily, longitudinally with respect to the body 5 to bring either the axle 9 or the axle 10 almost directly beneath cross bar 14 and in a position to function satisfactorily with respect to the springs.

To lend the proper rigidity, safety and freedom from noise to the structure and to cause the rods 11 and 12 to act as radius rods, I provide stout brackets comprising guiding horns 27. Webs of rubber 28 are disposed in the recesses 29 of these brackets and have metallic wear strips 30 covering their faces. When the axles ride up into the restricted channels provided by these wear strips and are drawn forcibly to a seating therein, they are cushioned, vibration is prevented, and since the brackets comprise the outer abutments 31, said axles have something to thrust against so that they may function as radius rods with respect to the axle that is in use and hold said axle against any tendency to twist out of proper transverse alignment.

In the form of the invention illustrated in Figures 5 and 7, the body 5 is supported by the springs 35; said springs having clipped thereto arcuate guide members 36 having ways 37 formed therein. Only one of these guide members is shown but it will be understood that the structure is duplicated at each side of the vehicle and between the track wheels 38 and ground wheels 39 upon the one hand and the side of the vehicle frame 5 upon the other hand. The axles 40 and 41 of the track and ground wheels are connected by rods 42, and these axles carry flanged rollers 43 which travel and are guided in the ways 37 of the guide members 36.

To further aid in maintaining proper alignment of the parts, the guide members are provided with wings 44 which extend upwardly far enough to overlap the leaves of the spring 35. A transverse tie rod 44a may be used to lend further rigidity to the parts, if desired.

Cables 46 and 47 are connected to the axles 40 and 41 and are actuated by the travelling nut 48 and screw 49 in the manner described with respect to Figures 2 and 3.

It will be observed that in Figure 2 the axle 9 almost directly underlies the center of the spring when the track wheels are in use and that in Figure 5 the rollers 43 directly underlie the center of the spring when the track wheels are in use. Substantially the same relationship exists with respect to axles 10 and 41 and the springs when the ground wheels are in use. Thus, it will be seen that at this time the cables and the rest of the shifting mechanism is under substantially no strain whatever.

In Figure 8 I have illustrated a hydraulic cylinder 50 that is pivoted at 51 and supplied with motive fluid through a flexible tube 52. The piston rod 53 of this cylinder is connected by a pivot link 54 with axles 10 and 41 and thrusts the truck structure in one direction or the other according to which set of wheels is to be used.

I am aware of the fact that it has long since been proposed to provide a vehicle body with wheels of such a nature as to adapt it to travel either upon a railroad track or upon a road bed. However, as far as I am aware, no structure has been heretofore proposed which will meet the requirements of safety, strength, rigidity and ease in changing from one position to the other in the manner above described.

I direct attention to the fact that it is not necessary to jack up the body of the vehicle in order to effect a shift from track to highway or vice versa. The leverage is so great in favor of the shifting mechanism that the shift may be effected with very little strain on the cables and associated parts. In effect what I do is to roll one set of wheels out of and the other set into operative position. The wheels move through so long a path in doing this, that the strain on the cables at any given moment is negligible.

It is to be understood that the invention is not limited to the precise construction set forth but that it includes within its purview whatever changes fairly come within the scope of the spirit of the appended claims.

Having described my invention, what I claim is:

1. The combination with a vehicle, of a set of track wheels therefor and a set of ground wheels therefor, a frame by which all of said wheels are carried, and means for shifting said frame bodily longitudinally with respect to the vehicle body to thereby bring either of said sets of wheels to a common operative position, and means for supporting the vehicle body from the set of wheels moved to such operative position.

2. A structure as recited in claim 1 wherein the last named means supports the body from the wheels independently of the shifting means.

3. A structure as recited in claim 1 wherein the said shifting means comprises a travelling element, means for imparting movement to said travelling element, and elements connected to said travelling element and to the frame for imparting movement to the frame from the travelling element.

4. A structure as recited in claim 1 in combination with abutments into engagement with which the free end of said frame is drawn during the shifting movement to thereby cause said frame to function as a radius rod with respect to the wheels that are in action.

5. A structure as recited in claim 1 in combination with abutments having recesses formed therein and cushions located in said recesses, the free end of said frame being drawn into engagement with said cushions in the shifting operation to thereby cause said frame to function as a radius rod with respect to the wheels that are in action.

6. A device of the character described comprising a vehicle body, springs carried thereby, arcuate channel members carried by said springs, a set of ground wheels, a set of track wheels, a frame for supporting the ground and track wheels, members carried by said frame and movable in said arcuate way, and means for shifting the frame endwise in said arcuate way.

7. A device of the character described comprising a vehicle body, springs carried thereby, arcuate channel members carried by said springs, a set of ground wheels, a set of track wheels, a frame for supporting the ground and track wheels, members carried by said frame and movable in said arcuate way, and means for shifting the frame endwise in said arcuate way, the throw of the parts being such that when the frame reaches its limit of movement in one direction one or the other of said sets of wheels is substantially centrally disposed with relation to the spring.

8. The combination with a vehicle body of a supporting spring for the same, a frame extending longitudinally of the vehicle body, ground wheels at one end of the said frame, track wheels at the other end of said frame, means for shifting said frame bodily longitudinally with respect to the vehicle body in such manner as to bring either the ground wheels or the track wheels into operative position with respect to substantially the same point upon said spring, and an abutment against which said frame thrusts at the end occupied by the wheels which are not in use, said frame then acting as a radius rod with respect to the wheels which are in use.

9. The combination with a vehicle body of a supporting spring for the same, a frame extending longitudinally of the vehicle body, ground wheels at one end of the said frame, track wheels at the other end of said frame, and means for shifting said frame bodily longitudinally with respect to the vehicle body in such manner as to bring either the ground wheels or the track wheels into operative position with respect to substantially the same point upon said spring.

KIRWAN Y. MESSICK.